United States Patent [19]

Rosenquist et al.

[11] Patent Number: 5,482,014

[45] Date of Patent: Jan. 9, 1996

[54] HIGH OUTPUT AUTOMOTIVE ENGINE GASKET ASSEMBLY AND METHOD OF MAKING SAME

[75] Inventors: Gerald A. Rosenquist, Lake Zurich; Arnold B. Fox, Deerfield, both of Ill.

[73] Assignee: Fel-Pro Incorporated, Skokie, Ill.

[21] Appl. No.: 373,560

[22] Filed: Jan. 17, 1995

[51] Int. Cl.$^6$ ..................................................... F16J 15/12
[52] U.S. Cl. ..................... 123/193.3; 277/235 B
[58] Field of Search .............. 123/193.3, 193.5; 277/235 B, 227, 233

[56] References Cited

U.S. PATENT DOCUMENTS

| | | | |
|---|---|---|---|
| 4,311,318 | 1/1982 | Czernik et al. | 277/235 B |
| 4,659,410 | 4/1987 | McDowell et al. | 277/235 B |
| 4,662,643 | 5/1987 | Rosenquist | 277/235 B |
| 4,834,399 | 5/1989 | Udagawa et al. | 277/235 B |
| 5,125,375 | 6/1992 | Vuk | 123/193.3 |
| 5,161,498 | 11/1992 | Miyaoh | 123/193.3 |
| 5,255,926 | 10/1993 | Udagawa | 277/235 B |
| 5,275,139 | 1/1994 | Rosenquist | 123/193.3 |
| 5,310,197 | 5/1994 | Bruch et al. | 277/235 B |

FOREIGN PATENT DOCUMENTS

| | | | |
|---|---|---|---|
| 0594322 | 4/1994 | European Pat. Off. | 277/235 B |
| 1917122 | 10/1970 | Germany | |
| 55-117052 | 9/1980 | Japan | 277/235 B |

*Primary Examiner*—David A. Okonsky
*Attorney, Agent, or Firm*—Laff, Whitesel, Conte & Saret, Ltd.

[57] ABSTRACT

An automotive head gasket assembly and shim for installation between the head and block of an engine is disclosed. The head gasket includes a main body of a first thickness having a central core and compressible composite facing layers laminated to the surface of the core. The main body defines a plurality of combustion openings. A fire ring is disposed and secured in each combustion opening. Each of the fire rings includes a generally U-shaped armor having a pair of legs overlying and underlying the main body adjacent a combustion opening and a central body connecting the legs and ensheathing a wire ring for providing a combustion seal. A shim is temporarily disposed on the gasket on one of the facing layers. The shim surrounds each of the combustion openings and defines openings thereat of a size greater than the size of the wire ring so that the wire ring is disposed to lie within the opening. The shim is adapted to be adhesively secured to one of the head and the block and to form a groove to resist blow-out of the gasket assembly and to enhance sealing.

11 Claims, 2 Drawing Sheets

HIGH OUTPUT AUTOMOTIVE ENGINE GASKET ASSEMBLY AND METHOD OF MAKING SAME

FIELD OF THE INVENTION

This invention relates to gaskets. More particularly, this invention relates to gasket and shim assemblies for high-performance automobile engines.

BACKGROUND OF THE INVENTION

Standard passenger car laminated gaskets, used in a conventional manner, are inadequate for high output, high-performance automobile engines, such as those used for racing. Specifically, these standard gaskets frequently result in blow-out and leakage when cylinder pressures exceed the clamping force of the head bolts or studs. Under excessive pressure, the heads tend to separate from the blocks, causing the gaskets to unload, and generating leakage paths for liquids and gases. In addition, if the separating force is great enough, the combustion seal may be moved out of position which results in engine failure.

Thus, attempts have been made to improve the gaskets used in high output, high-performance automobile engines and a number of such are referred to in U.S. Pat. No. 5,275,139 (hereinafter referred to as the '139 patent). An improved method of sealing a high-performance engine assembly is also described. In particular that patent describes that use of a head gasket having an oversized fire ring, and a groove in either or both of the head and the block, to facilitate and provide enhanced sealing of the head and block for high output, high-performance engines, such as racing engines. The grooves provided in the head and/or block are typically formed by machining an annular fire ring receiver groove in the head or block surface (or both) adjacent the cylinders.

The method disclosed in the '139 patent requires that an annular groove be provided, typically by machining, in the head, or in the block, or in both. This machining requirement is generally difficult and time consuming to perform. Sometimes it cannot be accomplished at all. Thus, it would be desirable to provide an improved mechanism for providing such grooves, especially for use in environments where machining of such grooves is impractical, such as in aftermarket applications, in heavy duty engine environments, and for irregularly shaped combustion openings.

Accordingly, an object of the present invention is to provide an improved sealing mechanism for high-performance internal combustion engines which eliminates the need for machining grooves into a head and/or a block.

It is another object of the present invention to provide an improved sealing mechanism for high-performance internal combustion engines that effectively seals the engine and prevents blow-out of the wire ring during operation of the sealed engine assembly.

SUMMARY OF THE INVENTION

In accordance with the present invention, an improved method for sealing a high-performance internal combustion engine having a head and block, each having a main clamping surface is provided. The method comprises the steps of providing a head gasket comprising a main body having a central core and compressible facing layers laminated to the surfaces of the core, the main body defining a plurality of combustion openings, bolt holes and liquid passageways, and a fire ring for each combustion opening, each of the fire rings comprising a wire ring and an armor ensheathing the wire ring and having legs which grip the edges of the main body adjacent the associated combustion opening; providing a shim for each combustion opening at one or both of the head and the block, each of the shims defining openings complementary to the head gasket combustion openings; securing each shim to one of the head and block so that the complementary shim openings are generally concentric with the combustion openings and spaced outwardly from the combustion openings to define grooves communicating with the combustion openings, each groove having a land area and a generally vertical wall which intersects with a main clamping surface provided by the shim; and positioning the gasket on the block, between the head and block, so that when the head is torqued down, each fire ring is disposed within a groove and the land area compresses the fire rings to provide primary seals therewith at the land area. In one form of the practice of the method the gasket and the shim are preassembled and are positioned together between the head and the block. Preferably the step of securing each shim comprises adhesively securing each shim to one of the head and block.

The invention also comprises an automotive head gasket assembly for installation between the head and block of an engine, the assembly comprising a main body of a first thickness including a central core and compressible facing layers laminated to the surface of the core, the main body defining a plurality of combustion openings, and a fire ring disposed and secured in each combustion opening, each of the fire rings comprising a generally U-shaped armor having a pair of legs overlying and underlying the main body adjacent a combustion opening and a central body connecting the legs and ensheathing a wire ring for providing a combustion seal, the armor having a second vertical dimension greater than the first thickness prior to assembly, and a shim having a first major surface disposed on the gasket on at least one of the facing layers, the shim surrounding each of the combustion openings, the shim openings being of a size greater than the size of the wire ring so that the wire ring is disposed to lie within the shim opening, the shim being adapted to be secured, as in a permanent fashion, to one of the head and the block.

The shim is adapted to be adhesively secured to one of the head and the block and to that end the second major surface of the shim is provided with an adhesive which, in a preferred form, is an uncured layer of elastomer.

In one form, the head gasket assembly includes a first shim disposed on one facing layer of the head gasket and a second shim disposed on the other facing layer of the head gasket.

In yet another form of the invention, an automotive engine and head assembly is provided which comprises a head, a block defining cylinders, a head gasket, and a gasket shim. The head and block together define a pair of confronting clamping surfaces. The head gasket is disposed between the clamping surfaces of the head and the block, the head gasket comprises a main body having a central core and compressible facing layers laminated to the surfaces of the core, and the main body defines a plurality of combustion openings, bolt holes and liquid passageways. A fire ring is provided for each combustion opening, each of the fire rings comprising a wire ring and an armor ensheathing the wire ring and having legs which grip the edges of the main body adjacent the associated combustion opening. The gasket shim defines openings complementary to, concentric with, and surrounding each of the combustion openings and are secured to one of the head and the block. The gasket shim openings are of a size greater than the size of the fire rings so that the fire rings lie within the shim openings. In a preferred form, the gasket shim is adhesively secured to one of the head and the block. A gasket shim may be secured to each of the head and the block.

Further objections, features and advantages of the present invention will become apparent from the following description and drawings.

DETAILED DESCRIPTION OF THE PREFERRED EMBODIMENTS

Figure 1:
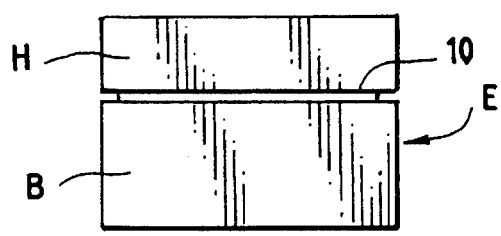
FIG. 1 is a schematic, side elevational view of an automotive engine assembly in accordance with the present invention.

Referring now to the drawings, an engine assembly in accordance with the present invention comprises an engine E (shown schematically in FIG. 1) having a head H and a block B. An automotive head gasket assembly 10 in accordance with this invention is disposed between them in a sealing relationship against their confronting main clamping surfaces.

The head and block define a plurality of combustion cylinders as well as oil and coolant passages and bolt holes via which the engine assembly is clamped. The head gasket 10 defines combustion openings 20, which are complementary to and aligned with the cylinders, coolant and oil passages, and bolt holes 24 (FIG. 2).

Figure 2:
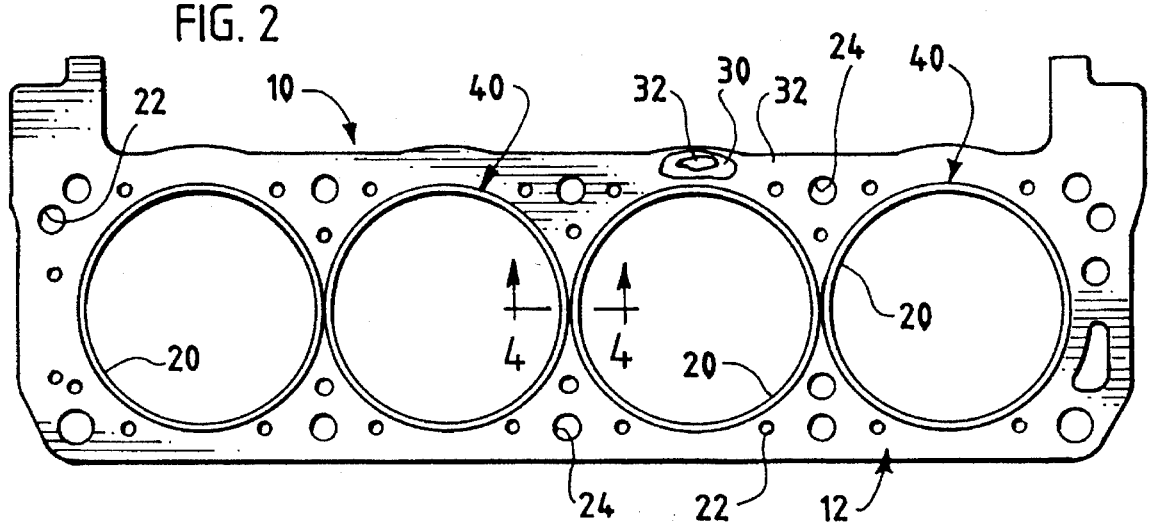
FIG. 2 is a plan view of a head gasket employed in the engine assembly of FIG. 1.

As shown in FIG. 2, the gasket 10 comprises a main body 12 which includes a central metal core 30, such as of cold rolled steel, and compressible facing layers 32 laminated to the surfaces of metal core 30. Core 30 may be solid or perforated. Facing layers 32 may be of typical composite fiber/elastomer materials, such as glass fibers or other fibrous materials and may utilize nitrile, neoprene, or polyacrylic elastomers as binders. Fillers and other conventional ingredients may also be present. Graphite facing layers may be used as well and if so used, will typically be used with a perforated metallic core.

Figure 4:
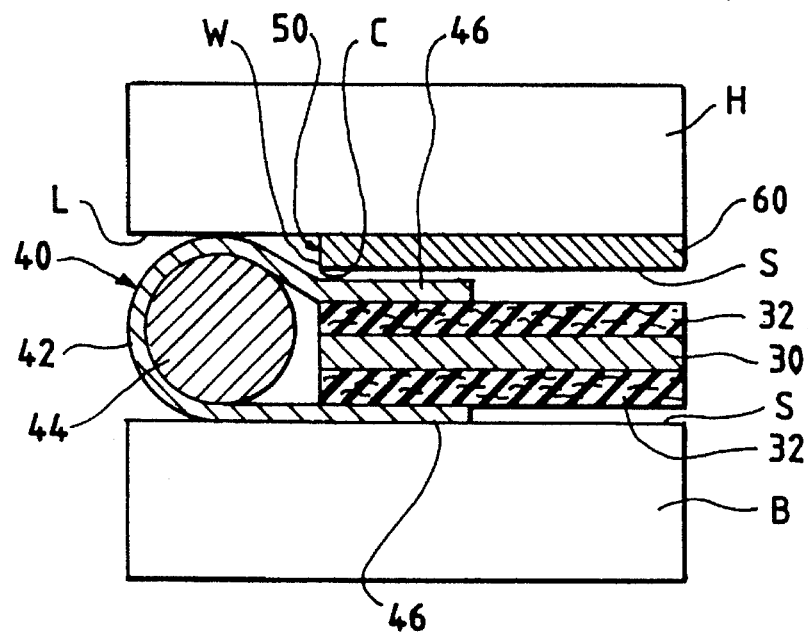
FIG. 4 is a cross-sectional view taken substantially along line 4—4 of FIG. 2 when a head gasket is installed and a shim is present.
Figure 5:
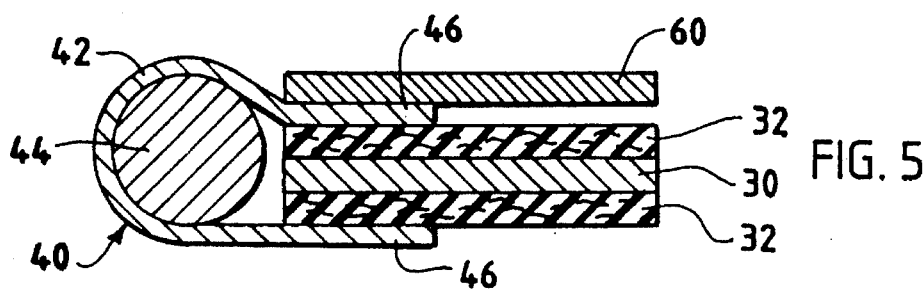
FIG. 5 is a cross-sectional view, like that of FIG. 4, but with head gasket and shim assembled for installation together between the head and block of an engine.

At each combustion opening 20, a fire ring 40 is provided (FIGS. 2, 4). Fire ring 40 includes an armor 42 and a wire ring 44. Wire 44 may be made of low carbon steel. Copper or stainless steel wires may also be used. Armor 42 may be stainless steel and is generally of a U-shaped cross-section having a closed end, which receives and ensheathes the wire ring 44, and a pair of legs 46 which overlie and grip the main gasket body at the peripheries of the combustion openings 20. The legs 46 may preferably fully embrace the peripheries of the main body or may comprise tabs, as illustrated by U.S. Pat. No. 3,560,007, for suspending the wire ring 44 in the opening.

Although the head gasket 10 itself so far described employs well known features and components, it is different in the embodiment illustrated from most such gaskets by its use of an oversized wire ring 44 and of a fire ring 40 having a thickness which is substantially greater than the thickness of the main body 12. A typical gasket of the present invention may have a body of about 0.042–0.045 inches with a fire ring having a 0.046 diameter low carbon wire and an armoring of 0.006 inch thick stainless steel for an overall armor thickness of about 0.058 inch as was the case with the gasket disclosed in U.S. Pat. No. 5,275,139.

Similar to the disclosure in U.S. Pat. No. 5,275,139, the sealing system of the present invention also contemplates the provision and use of a groove 50 which is provided in one or both of the head and block of the engine (FIG. 4). Thus, a perimetric groove surrounding each cylinder is provided at the clamping surface of the head adjacent to, and generally concentric with, the combustion opening 20 in the main body 12 of the gasket. The groove may be variously configured, but it defines a recess in the head having a surface which may be referred to as a generally horizontal land area L and a generally vertical wall W extending between land area and confronting clamping surface S. The wall and clamping surface S intersect in a corner C which may preferably be generally square. The height of the groove is such that when the engine is closed and the gasket is properly positioned, the wire ring 44 will be significantly compressed. It may be possible to compress these wires less than is normally done, and still seal because of the secondary seal. Less compression will reduce bore distortion and brinnelling of aluminum heads.

From FIGS. 2 and 4, it will be apparent that when the gasket is positioned on the block relative to the head and the gasket 10 is torqued down between the clamping surfaces via bolts (not shown), that the gasket is securely clamped into sealing engagement with the head and block and the wire ring is compressed. Indeed the gasket and armor produce a combustion seal which has a primary seal against the land area L, a secondary seal against the corner C and a tertiary seal in the zone of the legs 46 of the armor. The plural seals also produce a labyrinth effect, with any escaping gas being under reduced pressure at the secondary and tertiary seals making sealing of those zones somewhat easier. Of course, liquid seals are provided by composite facing layers 32.

All of this is as described in connection with the disclosure in U.S. Pat. No. 5,275,139, and the gasket and engine assemblies described provide combustion seals which are more effective than those currently used and which are more effective than those typically used in high-performance engines. The assemblies resist pull-in, the tendency of wire to be pulled into the combustion cylinders under high vacuum under extreme conditions. Similarly, physical blowout of the armors and associated wire rings is avoided by the groove construction and corner C, and by-pass of gases in extreme operating conditions is avoided via the multiple (primary, secondary and tertiary) gas seals.

In accordance with the present invention, a head groove configuration like that of U.S. Pat. No. 5,275,139 is provided in a different manner, one which does not require special grinding and machining operations. That is accomplished by providing a shim 60 which is generally complementary in configuration to the main body 12 of the gasket 10 and which is adapted to be secured to the head when utilized in accordance with the embodiment illustrated in FIG. 4. Shim 60 then provides a clamping surface S.

Figure 3:
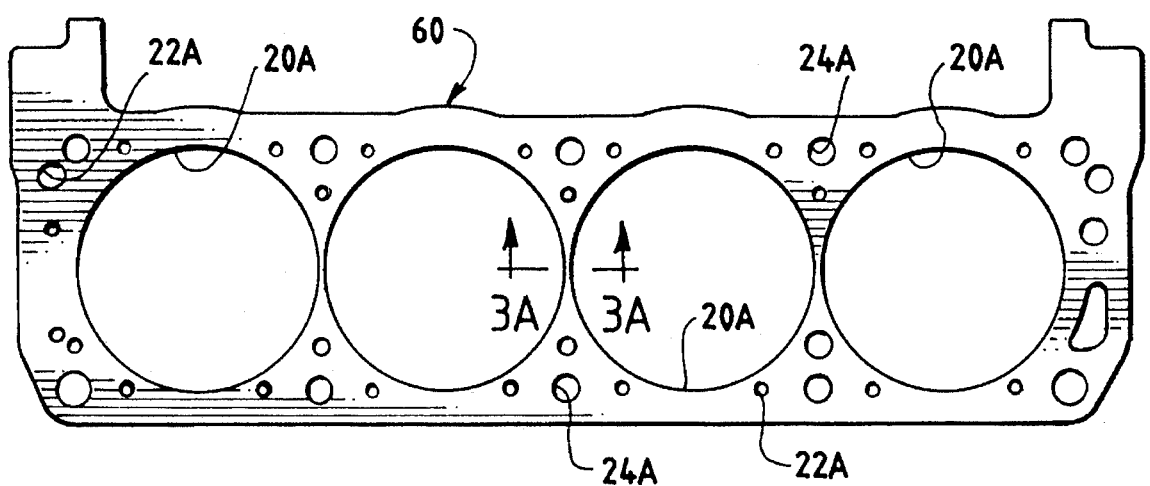
FIG. 3 is a plan view of a shim used with the head gasket in accordance with the present invention.
Figure 3A:
FIG. 3A is a cross-sectional view taken along line 3A—3A of FIG. 3.

To that end, shim 60 is preferably of metal, as of carbon steel, or alternatively of stainless steel, and may be of a suitable thickness, such as 0.010 inch thick (FIGS. 3, 3A). Shim 60 defines openings complementary in location to those in the main body of gasket 10, such as coolant and oil passages 22A and bolt holes 24A. Additionally, complementary combustion openings 20A are provided in shim 60. Openings 20A are concentric with and greater in size than the wire ring. Openings 20A are larger in diameter than the combustion openings 20 defined by the fire rings 40. That is so that when the head is torqued down, a fire ring 40 is disposed within the combustion opening 20A (and groove 50) so that the land area L and wall W (and surface S) provided by the shim 60 can cooperate with the fire ring and gasket in the manner described above and in U.S. Pat. No. 5,275,139.

Preferably the shim 60 is adapted to be secured to the surface of head H to form groove 50, as by a suitable adhesive. One such suitable adhesive is a partially cured acrylonitrile elastomer which will rapidly fully cure in response to the elevated temperatures encountered in an engine, thereby to adhere the shim to the head surface. A preferred organic curing agent present in the elastomer is dicumylperoxide. Desirably such an uncured rubber is provided as a coating on the entire surface of the shim 60 facing the head and is sufficiently tacky to hold fast initially to that surface. Heating the shim will activate the rubber and will cause it to bond in a relatively permanent fashion to the head surface.

Although shim 60 may be separately positioned between the head H and gasket 10, it is preferable to supply them as a preassembly, with the openings of the associated gasket 10 and shim 60 properly aligned so that they may be inserted and installed as a unit between the head H and block B of an engine E. In this case a first major surface of the shim faces the facing layer and the outwardly facing surface of the shim is provided with an adhesive for securance to the head and/or block.

Figure 6:
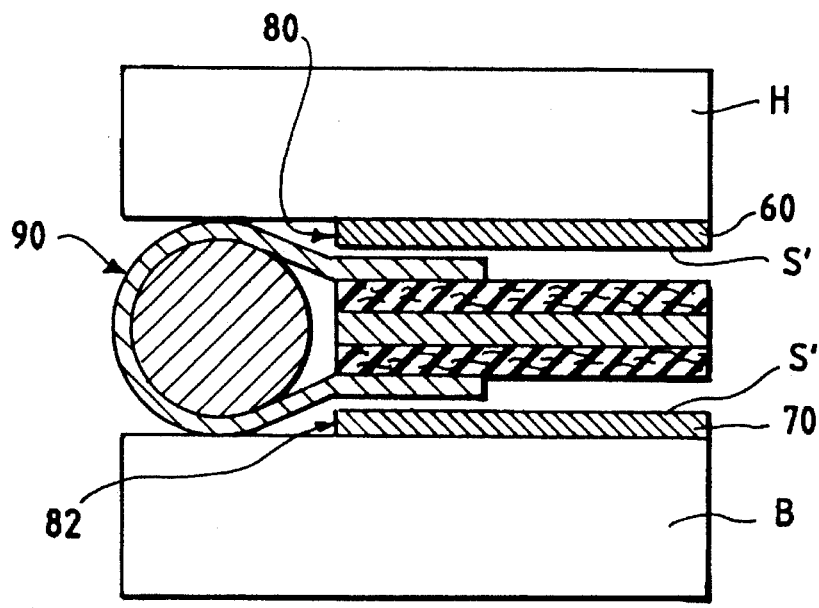
FIG. 6 is a cross-sectional view like that of FIG. 4, but showing another embodiment of the present invention.

Enhanced sealing and interlocking can be achieved by providing a further groove in the clamping surface of the block, as illustrated in the embodiment shown in FIG. 6. These groove portions which define a pair of confronting spaced surfaces cooperate with a fire ring 90 having an armor and wire ring to provide primary and secondary seals at each of the two grove locations, rather than at one groove location (as in the embodiment of FIG. 4), thereby enhancing the sealing potential and stability of the assembly under high stress.

In the embodiment of FIG. 6, a block side groove 82 complementary to the head side groove 80 is formed by providing a second shim 70 between the gasket and the block. Similar to shim 60, shim 70 is generally complementary in configuration to the main body 12 of the gasket 10 and is adapted to be secured to the block in the same manner that shim 60 is secured to the head in FIG. 4.

Shim 70 also defines openings which are complementary in location to the combustion openings, bolt holes, and fluid passageways in the main body of the gasket. Similar to shim 60, the combustion openings of shim 70 are greater in size than the wire ring and larger in diameter than the combustion openings 20 defined by the fire rings 90. Thus, when the head is torqued down onto the block, fire ring 90 is disposed within the combustion opening (not shown) so that the land area and wall (and surfaces S') provided by shim 70 cooperate with the fire ring and gasket in the manner described in relation to the embodiment of FIG. 4.

Shim 70 is also adapted to be permanently secured to the surface of block B by the same adhesive used for securing shim 60 to head H. In addition, although shim 70 may be separately positioned between the block B and the gasket 10, it is preferable to preassemble the shim, with the openings of the gasket and shim properly aligned, so that the gasket, head shim and block shim may be installed as a unit between head H and block B of engine E.

From the foregoing it will be apparent to those skilled in the art that further modifications may be made and provided without departing from the spirit of the invention. Accordingly, the scope of the invention is to be considered as limited only to the extent made necessary by the appended claims.

What is claimed is:

1. A method of sealing a high-performance internal combustion engine having a head and a block, each having a main clamping surface, and an associated head gasket between said main clamping surfaces, the method comprises the steps of:

providing a head gasket comprising a main body having a central core and compressible facing layers laminated to the surfaces of the core, said main body defining a plurality of combustion openings, bolt holes and liquid passageways, and a fire ring for each combustion opening, each of said fire rings comprising a wire ring and an armor ensheathing said wire ring and having legs which grip the edges of the main body adjacent the associated combustion opening;

providing a shim for each combustion opening at one or both of said head and said block, each said shim defining openings complementary to the head gasket combustion openings;

securing each said shim to one of said head and block so that said complementary shim openings are generally concentric with said combustion openings and spaced outwardly from said combustion openings to define grooves communicating with said combustion openings, each said groove having a land area and a generally vertical wall which intersects with a main clamping surface provided by said shim; and positioning said gasket on said block, between said head and block, so that when said head is torqued down, each said fire ring is disposed within a groove and said land area compresses said fire rings to provide primary seals therewith at said land area.

2. The method of claim 1 comprising the further steps of preassembling said gasket and said shim and then positioning them together between said head and said block.

3. The method of claim 1, and wherein the step of securing each said shim comprises adhesively securing each said shim to one of said head and block.

4. An automotive head gasket assembly for installation between the head and block of an engine, comprising a main body of a first thickness including a central core and compressible facing layers laminated to the surface of the core, said main body defining a plurality of combustion openings, and a fire ring disposed and secured in each combustion opening, each of said fire rings comprising a wire ring and a generally U-shaped armor having a pair of legs overlying and underlying said main body adjacent a combustion opening and a central body connecting said legs and ensheathing said wire ring for providing a combustion seal, said armor having a second vertical dimension greater than said first thickness prior to assembly, and a shim having a first major surface disposed on said main body and over at least one of said facing layers and one of said legs, said shim surrounding each of said combustion openings, said shim openings being of a size greater than the size of said wire ring, so that said fire ring lies within said shim opening, said shim being adapted to be permanently secured to one of said head and said block to form a groove therewith so that when said gasket and shim are installed each said fire ring is disposed within a said groove and said fire rings bear against said head or block to provide primary seals therewith.

5. The head gasket assembly of claim 4, and wherein said shim is adapted to be permanently adhesively secured to one of said head and said block.

6. The head gasket assembly of claim 5, and wherein the second major surface of said shim is provided with an adhesive.

7. The head gasket assembly of claim 6, and wherein said adhesive is an uncured layer of elastomer.

8. The head gasket assembly of claim 4, and wherein a first said shim is disposed on said facing layer of said head gasket and a second said shim is disposed on the other facing layer of said head gasket.

9. An automotive engine and head assembly comprising a head, a block defining cylinders, a head gasket, and a gasket shim, said head and block together defining a pair of confronting clamping surfaces;

said head gasket being disposed between said clamping surfaces of said head and said block, said head gasket comprising a main body having a central core and compressible facing layers laminated to the surfaces of the core, said main body defining a plurality of combustion openings, bolt holes and liquid passageways, and a fire ring for each combustion opening, each of said fire rings comprising a wire ring and an armor ensheathing said wire ring and having legs which grip the edges of the main body adjacent the associated combustion opening; and said gasket shim defining openings complementary to, concentric with, and surrounding each of said combustion openings and being secured to the clamping surface of one of said head and said block, said gasket shim overlying said armor legs and said facing layer, said gasket shim openings being of a size greater than the size of said fire rings so that said fire rings lie within said shim openings, said gasket shim defining grooves with the clamping surface to which it is secured, so that when said head is torqued down relative to said block, said fire rings bear against said head and block to provide primary seals thereat.

10. The engine and head gasket assembly of claim 9, and wherein said gasket shim is adhesively secured to one of said head and said block.

11. The engine and head gasket assembly of claim 9 and wherein a said gasket shim is secured to each of said head and said block.

* * * * *